Figure 1:
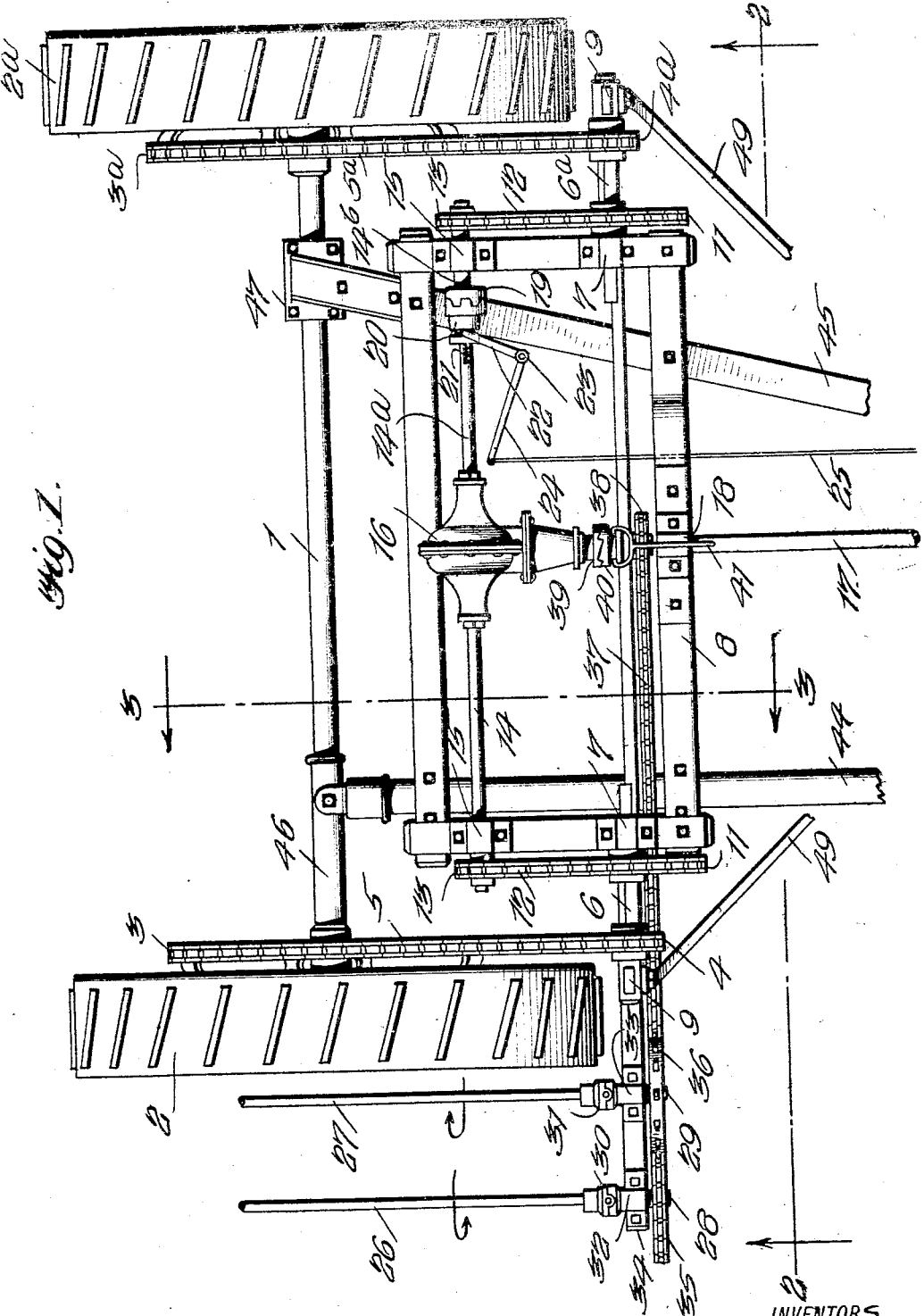

D. E. HURTIG & F. L. HAGGART.
ATTACHMENT FOR HEADERS AND HEADER BINDERS.
APPLICATION FILED NOV. 20, 1915.

1,251,379.

Patented Dec. 25, 1917.
2 SHEETS—SHEET 2.

WITNESSES:

INVENTORS
DAVID E. HURTIG,
FRANK L. HAGGART,
BY Munn & Co.
ATTORNEYS

UNITED STATES PATENT OFFICE.

DAVID E. HURTIG AND FRANK L. HAGGART, OF DELPHOS, KANSAS.

ATTACHMENT FOR HEADERS AND HEADER-BINDERS.

1,251,379.

Specification of Letters Patent.　Patented Dec. 25, 1917.

Application filed November 20, 1915.　Serial No. 62,518.

*To all whom it may concern:*

Be it known that we, DAVID E. HURTIG and FRANK L. HAGGART, citizens of the United States, and residents of Delphos, in the county of Ottawa and State of Kansas, have invented certain new and useful Improvements in Attachments for Headers and Header-Binders, of which the following is a specification.

Our invention is an improvement in attachments for headers and header binders, and the invention has for its object to provide mechanism of the character specified capable of being attached to existing machinery of the harvester type, as, for instance, headers and header binders, for connecting the wheels of the harvester to a motor, to thus transform the harvester into a self-propelled machine.

Figure 2:
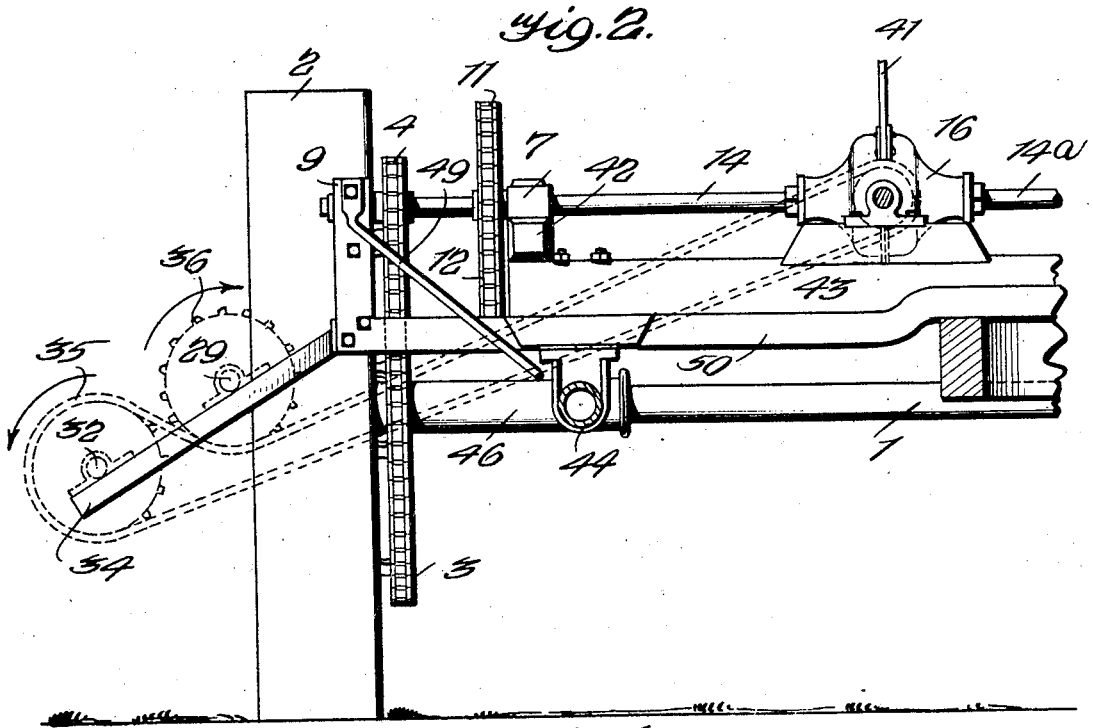
Figure 3:
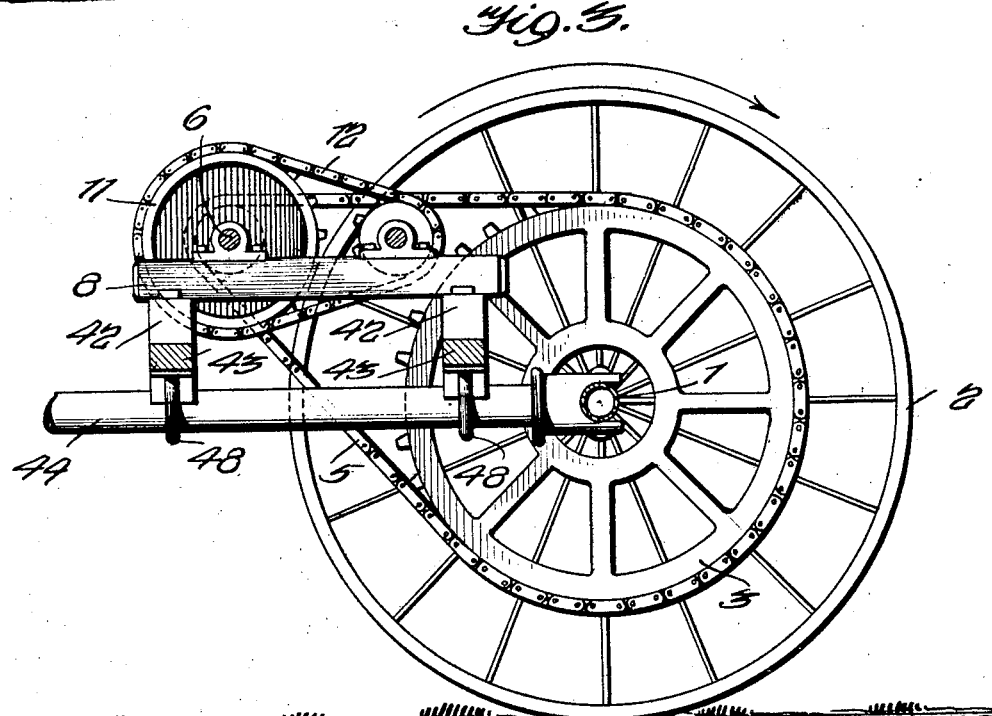

In the drawings:

Figure 1 is a partial top plan view of the transmission mechanism in connection with a grain heading machine or a binding header, where designed for propulsion by use of horse power; and Figs. 2 and 3 are sections on the lines 2—2 and 3—3, respectively, of Fig. 1, each looking in the direction of the arrows adjacent to the line.

In the present embodiment of the invention, the main axle 1 of the machine is provided at each end with a propelling wheel 2, 2ª, the said wheels being journaled on the ends of the axle, and each wheel 2 and 2ª has secured to the inner face thereof and coaxial therewith a sprocket wheel 3 and 3ª, respectively, the sprocket wheels being rigid with the propelling wheels.

Each of the sprocket wheels 3 and 3ª is connected to a similar sprocket wheel 4 and 4ª, respectively, in rear of the respective wheels 2 and 2ª, by means of a sprocket chain 5 and 5ª, respectively.

The sprocket wheels 4 and 4ª are secured to countershafts 6 and 6ª, respectively, and each of the countershafts 6 and 6ª is journaled at its inner end in a bearing 7 on a substantially rectangular frame 8 arranged in rear of the axle 7.

The outer end of each countershaft is supported by a bearing 9 on the upper end of an upright or standard 10 to be later described. Each of the said countershafts is provided with a second sprocket wheel 11 adjacent to the bearing 7.

The sprocket wheels 11 of the counter- shafts 6 and 6ª are connected by sprocket chains 12 with sprocket wheels 13 connected to a drive shaft, consisting of alined sections 14 and 14ª. These sections of the drive shaft are journaled in bearings 15 on the frame 8 before mentioned, and at their adjacent ends, the shaft sections are connected by a differential of usual construction (not shown) arranged within the differential casing 16.

A motor driven shaft 17 is arranged at right angles to the drive shaft, the motor driven shaft being journaled in a bearing 18 on the frame 8, and the end of the said shaft adjacent to the drive shaft is connected to the sections 14 and 14ª of the drive shaft by the differential in the casing 16 in the usual manner.

Thus when the motor driven shaft 17 is rotated by the motor (not shown) the shaft sections 14 and 14ª will be driven, but the said sections may move angularly with respect to each other, as in turning.

The sprocket wheel 13 adjacent to the propelling wheel 2 is secured to the shaft section 14, but the sprocket wheel 13 adjacent to the propelling wheel 2ª is secured to a sleeve 14ᵇ, which is journaled loosely on the shaft section 14ª at the bearing 15.

The sleeve 14ᵇ and the shaft section 14ª may be connected to rotate together, by means of a clutch. The one section 19 of the clutch is rigid with the sleeve 14ᵇ, while the other section 20 of the clutch is feathered on the shaft section 14ª, as indicated at 21.

An elbow lever consisting of arms 22 and 24 extending at approximately a right angle with respect to each other, is arranged adjacent to the clutch, and is pivoted at 23 to a fixed support.

The arm 22 of the elbow lever has a fork, and the arms of the fork are provided with means for engaging an annular groove in the section 20.

A link 25 is connected with the arm 24 of the elbow lever, and suitable operating means (not shown) is connected with the link to move the same longitudinally to operate the clutch. When the clutch sections are connected as shown in Fig. 1, the supporting and propelling wheels 2 and 2ª will be driven to drive the machine. When the sprocket wheels 13 are disconnected by disconnecting the clutch, the said wheels will not be driven.

The frame 8 before mentioned is supported by blocks 42 and sills 43, which are mounted on elements 44 and 45 of the frame of the header-binder, and the sills 43 are connected to the element 44 by U-shaped clips 48.

The bearings 9 before mentioned are in the uprights or standards 10 at the ends of a portion 50 of the frame, and inclined braces 49 extend rearwardly and downwardly from the upper ends of these standards to a connection with the frame.

The beam 45 is in effect a sill beam with the axle and the frame, and the frame 8 is connected at the end and adjacent to this sill beam 45.

The propelling wheels may be driven from the motor, which is supported at the rear of the frame, and which drives the shaft 17, or the said wheels may be disconnected from the motor and the shafts 26 and 27 connected therewith. Thus either the propelling wheels or the operating mechanism, or both, may be connected with the motor.

In the ordinary header binder, the supporting wheels 2 and 2ª not only support the apparatus, but they also drive the operating mechanism thereof; in the present instance the supporting wheels have no driving connection with other units of the mechanism, but are simply propelled by the motor.

The improvement may be attached to existing headers and header binders without change in the binder or header, merely adding the sill 45 and the parts supported thereby, namely, the frame 8 and connected elements.

I claim:

1. In combination, a frame, an axle, drive wheels mounted on the ends of the axle, countershafts journaled parallel with the axle and having driving connection with the drive wheels, a sectional drive shaft parallel with the axle, a differential connecting the sections of the drive shaft, a motor shaft geared to the sectional drive shaft at the differential connection, a sprocket wheel and chain connection between each section of the drive shaft and the adjacent countershaft, one of the said sections being loose on the drive shaft section, and a clutch for connecting a connection to a drive shaft section.

2. In combination, a frame, an axle, drive wheels mounted upon the ends of the axle, transversely arranged countershafts having driving connections with the drive wheels, a sectional drive shaft having a differential connection between the sections and having the sections connected with the respective countershafts to be driven thereby, a motor shaft geared to the sectional drive shaft at the differential connection, and a clutch between the countershaft and one of the drive shafts.

DAVID E. HURTIG.
FRANK L. HAGGART.

Witnesses:
F. B. PARTRIDGE,
J. B. RICHARDS.